United States Patent [19]

Lundstrom et al.

[11] Patent Number: 5,332,889
[45] Date of Patent: Jul. 26, 1994

[54] INTEGRATED CIRCUIT CARD PROGRAMMING DEVICE

[75] Inventors: Robert W. Lundstrom, Plymouth; Steven A. Miller, Mahtomedi; Eric J. Sorensen, Apple Valley, all of Minn.

[73] Assignee: DataCard Corporation, Minnetonka, Minn.

[21] Appl. No.: 993,105

[22] Filed: Dec. 18, 1992

[51] Int. Cl.5 ............................................. G06K 5/00
[52] U.S. Cl. ..................................... 235/380; 364/478
[58] Field of Search ............... 235/375, 492, 380, 480; 414/744.6, 225, 226; 901/17, 6; 364/478

[56] References Cited

U.S. PATENT DOCUMENTS 4,814,592  3/1989  Brandt et al. ...................... 235/375

Primary Examiner—Davis L. Willis
Assistant Examiner—Karl D. Frech
Attorney, Agent, or Firm—Merchant, Gould, Smith, Edell, Welter & Schmidt

[57] ABSTRACT

An integrated card programming device for programming an integrated circuit card. The integrated circuit card programming device has a base, a card input platform, and a transport. The transport is operably connected to the base and rotatably mounted about a rotational axis. The transport includes a transport arm radially disposed about the rotational axis. A card picker carriage is mounted on the transport arm. The card picker carriage has two picker arms. One or more personalization stations for programming an integrated circuit card are radially disposed about the transport. The personalization stations can program the cards to the French or ISO standards and are rotatable 180°.

4 Claims, 17 Drawing Sheets

INTEGRATED CIRCUIT CARD PROGRAMMING DEVICE

FIELD OF THE INVENTION

The present invention pertains to an integrated circuit card programming device for programming integrated circuit cards, sometimes referred to as "smart cards".

BACKGROUND OF THE INVENTION

The present invention pertains to an integrated circuit card programming device for programming integrated circuit cards. Integrated circuit cards are often used as credit cards or identification cards. Like a credit card, the integrated circuit card may have embossed letters, printing, or a magnetic strip for data storage on its surface. The integrated circuit fulfills a similar purpose as the magnetic strip, but generally has a greater capacity for storage of data and is a more stable storage medium.

Prior circuit card programming devices, such as the ones disclosed in U.S. Pat. No. 4,866,259 to Bonnemoy and U.S. Pat. No. 4,827,425 to Linden, did not provide a means for programming an integrated circuit card disposed on either the front or the back side. Nor did either Bonnemoy or Linden disclose a device capable of programming integrated cards having the integrated circuit disposed in either the French or ISO positions.

SUMMARY OF THE INVENTION

The present invention solves the problems present in the prior art by providing an integrated circuit card programming device having personalization stations which can program cards in both the French and ISO standard positions. The personalization station is also rotatable 180° in order to program the integrated circuit cards on either side. The integrated circuit card programming device of the present invention includes a base, a card input platform, and a transport. The transport is operably connected to the base and rotatably mounted about a rotational axis. The transport includes a transport arm radially disposed about the rotational axis. The transport arm has a distal end and a proximal end, the proximal end being proximate the axis. A card picker carriage is mounted on the arm for movement between a first position proximate the distal end and a second position proximate the proximal end. One or more personalization stations are radially disposed about the rotational axis.

The picker carriage in the first position can grasp a card from the input platform. The picker carriage can then be moved toward the second position and the transport rotated about the rotational axis to a position in radial alignment with one of the personalization stations. Then the picker carriage can be moved toward the first position to deposit the card in the personalization station to program the card.

The present invention also includes an improved picker carriage for grasping the integrated circuit cards. The picker carriage includes a chassis and a backstop operably connected to the chassis. The picker carriage also has two picker arms. Each picker arm has a picker end oppositely disposed from the backstop and a second end. Each picker arm is rotatably connected to the chassis between the first and second ends. The picker carriage also includes an axial member having a first end and a second oppositely disposed end. The second end of one picker arm is rotatably operably connected to the first end of the axial member and the second end of the other picker arm is rotatably operably connected to the second end of the axial member. Disposed between the first and the second end of the axial member is an arched surface operably connected to the axial member.

The carriage also includes an actuator for activating the picker arms. The actuator has an actuator rod with an arched surface distal end. The arched distal end is held against the arched surface of the axle member by a biasing means for biasing the surfaces together. The arched distal end and the arched surface are approximately concentric so that the arched distal end of the actuator can push against the arched surface of the axle member to rotate the picker arms from a first position wherein the picker ends are spaced distant the backstop to a second position wherein the picker ends are proximate the backstop for grasping the card between the picker ends and the backstop.

The present invention also includes an improved personalization station for programming an integrated circuit card. The personalization station includes a personalization station base operably connectable to an integrated circuit card programming device base. The station also includes a card receiving means for grasping the integrated circuit card to be programmed. The card receiving means has at least one contact for interfacing with an integrated circuit disposed on the card. The station also includes a reversible mounting means for mounting the card receiving means on the base. The reversible mounting means is capable of mounting the card receiving means on the base in a first position wherein the contact is disposed on the first side of the base, and a second position wherein the receiving means is rotated approximately 180° about the rotational axis so that the contact is disposed on a second and opposite side of the base.

The present invention also pertains to a personalization station similar to that described above having a contact pin housing for mounting the contact in a first position corresponding to the French position, and a second position corresponding to the ISO position. The contact pin housing may be used on a personalization station incorporating the reversible mounting means, or on one not incorporating the reversible mounting means.

DETAILED DESCRIPTION OF THE PREFERRED EMBODIMENT

Figure 1:
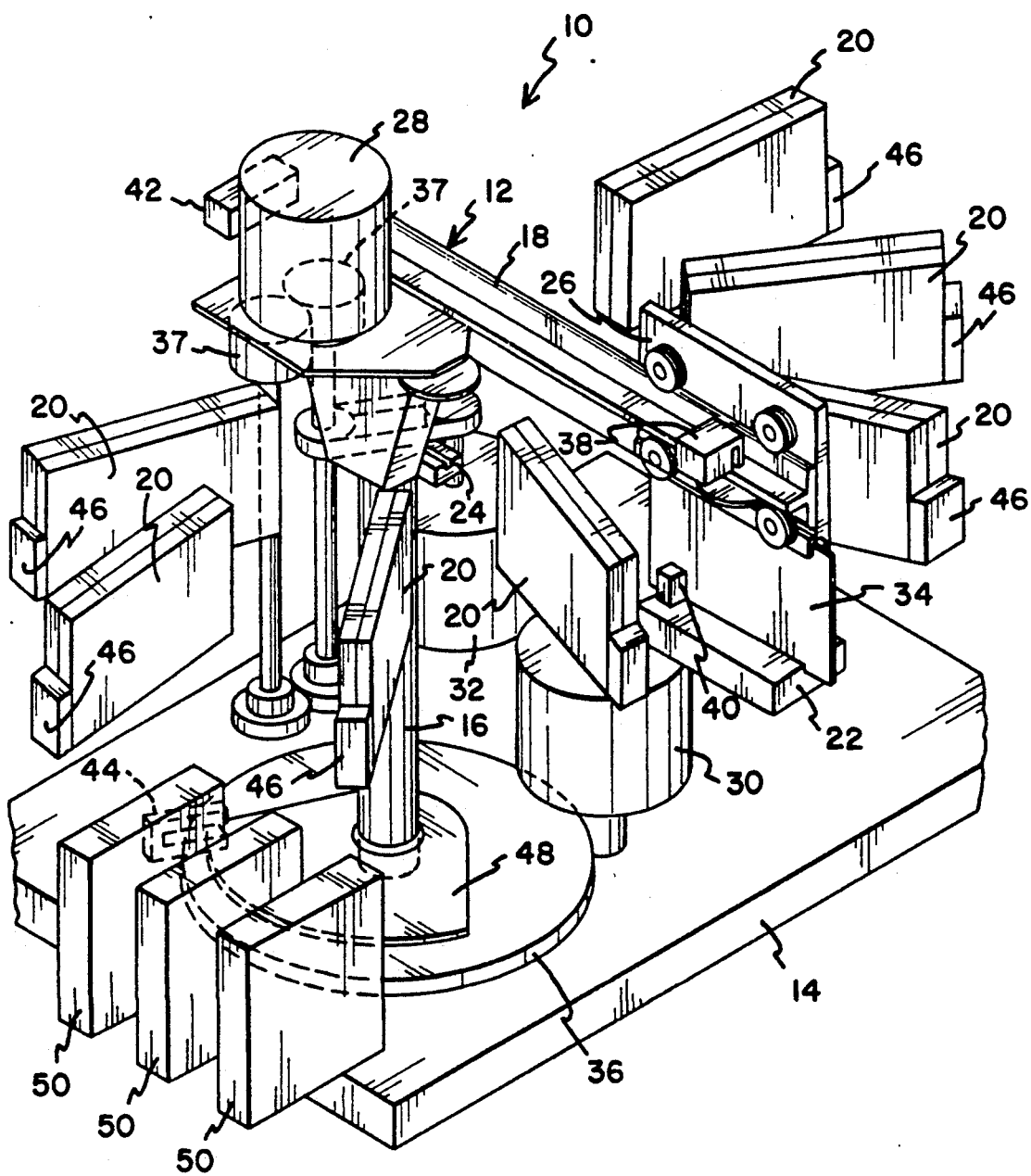
FIG. 1 shows a perspective view of an integrated circuit card programming device in accordance with the presence invention.

Referring now to the drawings, wherein like reference numerals designate identical or corresponding parts throughout the several views, FIG. 1 shows a schematic perspective view of an integrated circuit card (IC card) programming device 10. Programming device 10 includes a card transport 12 rotatably mounted on a base 14. Transport 12 has an elongated axial member 16 which is centered about a rotational axis approximately perpendicular to the base 14. Transport 12 also has a transport arm 18 disposed approximately radially from the rotational axis of transport 12. A card picker carriage 26 is slidably mounted on transport arm 18.

Integrated circuit card programming device 10 also includes a card input platform 22 and a card output platform 24. Also disposed approximately radially about the rotational axis of card transport 12 is one or more personalization stations 20.

Three stepper motors, including a carriage stepper motor 28, transport stepper motor 30, and output stepper motor 32, drive the movement of an integrated circuit card 34 through IC card programming device 10. Carriage stepper motor 28 drives carriage 26 along transport arm 18 between a first position proximate the distal end of transport arm 18 (as shown in FIG. 1) and a second position proximate the proximal or output end of transport arm 18. Transport stepper motor 30 drives the rotation of card transport 12 about its rotational axis by way of a gear 36. And output stepper motor 32 drives output rollers 37.

IC card programming device 10 also includes a control having a plurality of sensors. The sensors are preferably photosensors or Hall effect switches, however, other types of sensors can be used. IC card programming device 10 is preferably equipped with a carriage input sensor 38, a card input sensor 40, a carriage linear home sensor 42, a carriage rotational home sensor 44, one station card position sensor 46 disposed on each personalization station 20, and an output sensor proximal output rollers 37. The carriage rotational home sensor 44 is disposed about a flag plate 48. The controlling means may also include one or more key-card readers 50.

Figure 2:
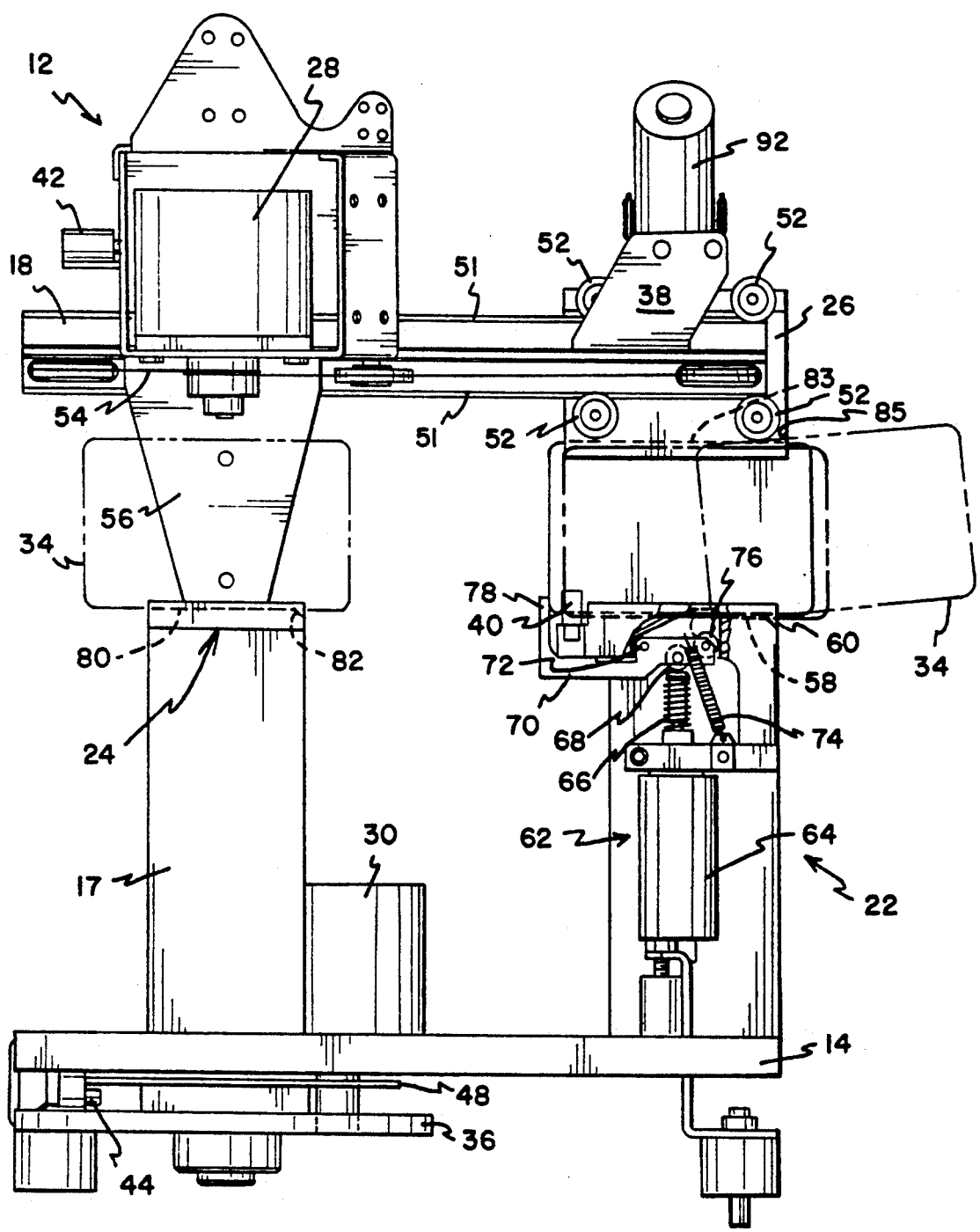
FIG. 2 shows a cross section of the integrated circuit card programming device shown in FIG. 1.
Figure 3:
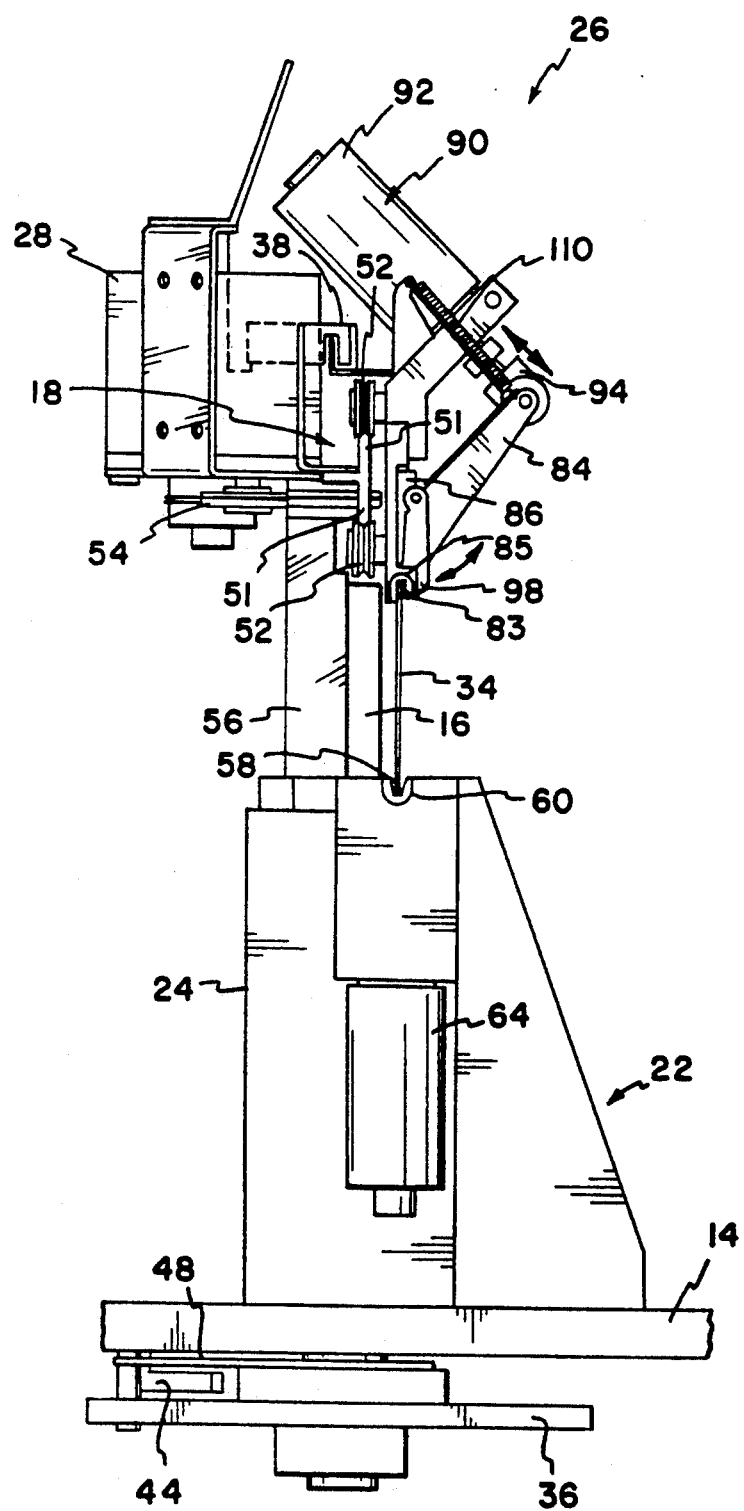
FIG. 3 shows an end view of the cross section of the integrated circuit card programming device shown in FIG. 2.
Figure 4:
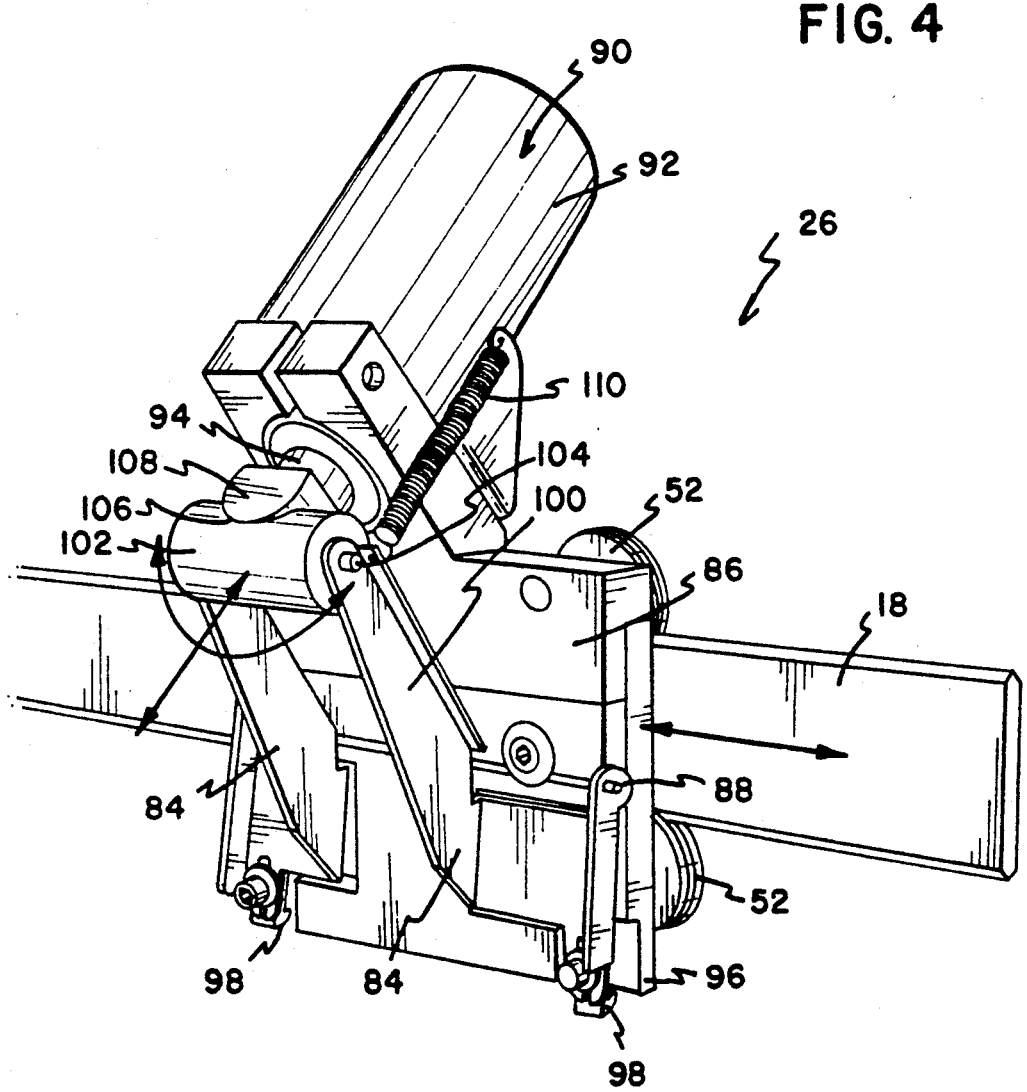
FIG. 4 shows a perspective view of a picker carriage.

FIG. 2 shows a cross-sectional view of IC card programming device 10 taken from FIG. 1. For clarity, personalization stations 20 are not shown in FIG. 2. Shown in detail in FIG. 2 are card transport 12, card input platform 22, and card output platform 24. FIG. 3 shows an end view of the cross-section shown in FIG. 2. FIG. 4 shows a perspective view of carriage 26.

As shown in FIGS. 2, 3 and 4, transport arm 18 has two oppositely disposed rails 51. Carriage 26 is mounted on rails 51 with two sets of oppositely disposed grooved rollers 52. Carriage 26 is driven between a first position proximate the distal end of transport arm 18 (as shown in FIG. 2) and the proximal end of transport arm 18 by carriage stepper motor 28 by way of a pulley system 54. FIG. 2 also shows a transport arm mounting bracket 56 operably connecting transport arm 18 with axial member 16.

Card input platform 22 includes a card receiving groove 58, as shown in FIGS. 2 and 3. Card receiving groove 58 preferably has a beveled entrance 60. Disposed beneath card receiving groove 58 is a card kicker 62. Card kicker 62 includes solenoid actuator 64 having an actuator rod 66 positioned to fire against a first bearing 68 rotatably mounted to a generally L-shaped kicker lever 70. L-shaped kicker lever 70 is rotatably connected to card input platform 22 about pin 72. Proximate a first end of kicker lever 70 is a second bearing 76.

Kicker lever 70 can be rotated from a first position, as shown in FIG. 2, to a second position. In the first position, second bearing 76 disposed at the first end of kicker lever 70 is spaced apart from groove 58 and a second end 78 of kicker lever 70 is disposed at an elevation greater than the low point of groove 58. In the second position, second bearing 76 is disposed above groove 58 and within groove 58, and second end 78 of kicker lever 70 is disposed below the bottom of groove 58. A spring 74 biases L-shaped kicker lever 70 toward the first position.

Card output platform 24 has a card receiving groove 80 similar to the groove 58 of input platform 22. The bottoms of grooves 58 and 80 are preferably, but not necessarily, co-planer. Card receiving groove 80 has a beveled entrance 82. Card out platform 24 is preferably operably connected to arm 18 for corresponding rotational motion. Disposed below platform 24 is an axial member support block 17.

As shown in FIGS. 3 and 4, picker carriage 26 includes two picker arms 84 rotatably mounted to a picker carriage chassis 86 about pin 88. Each picker arm 84 has a first picker end 98 and a second end 100. Picker carriage 26 also includes an actuator means 90 for activating the picker arms 84. Actuator means 90 includes a solenoid 92 having an actuator rod 94. A picker groove 83 having a beveled entrance 85 and a back stop 96 is operably connected to chassis 86 of picker carriage 26. Backstop 96 can either by integrally formed with chassis 86 or can be a separately formed element, the latter being shown in FIG. 4.

Card picker carriage 26 also includes a generally cylindrically shaped axle member 102 having a first end and an oppositely disposed second end. Each end of member 102 has an outwardly disposed pin 104. Second ends 100 of picker arms 84 are rotatably operably connected to oppositely disposed ends of axle member 102 about pins 104. Disposed between the first and second end of axle member 102 is an arched surface 106. Actuator rod 94 has an arched surface distal end 108. Arched distal end 108 is held against arched surface 106 of axle member 102 by a biasing means 110 for biasing surfaces 108 and 106 together. Arched distal end 108 and surface 106 are held together by biasing means 110 loosely enough to allow them to slide relatively to each other. Biasing means 110 is preferably a helical spring. Arched distal end 108 and arched surface 106 are approximately concentric when held together. Arched surface 106 can be concave and distal end 108 convexed, or arched surface 106 can be convexed and distal end 108 concave.

FIG. 4 shows picker arms 84 in a first position wherein picker ends 98 are spaced distantly apart from backstop 96. In FIG. 3, picker arms 84 are in a second position, wherein picker ends 98 are proximate backstop 96 for grasping card 34 between picker ends 98 and backstop 96.

Figure 5:
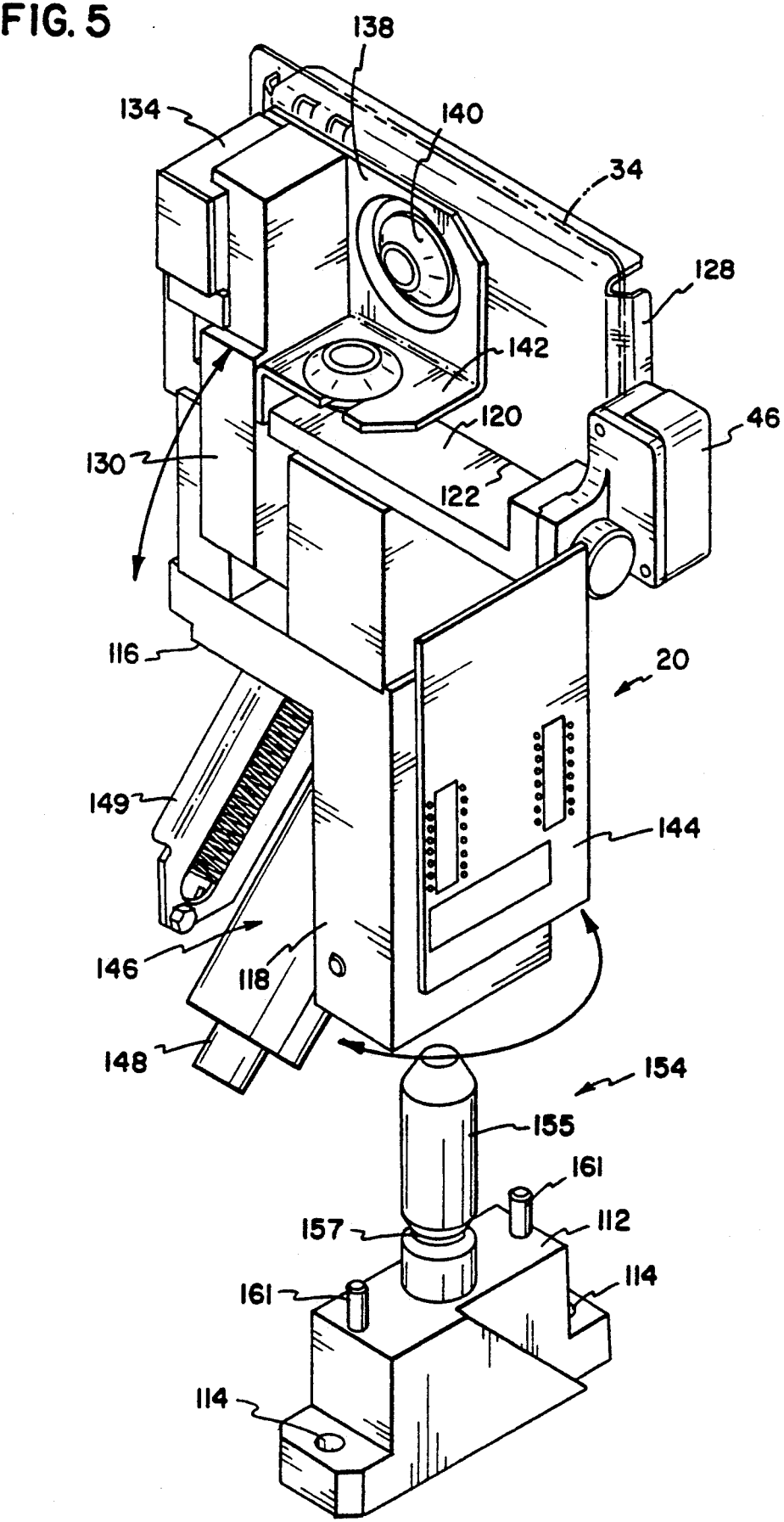
FIG. 5 shows a perspective view of a personalization station.

FIG. 5 shows a perspective view of a personalization station 20. Unlike the schematic version of personalization station 20 shown in FIG. 1, as shown in FIG. 5, personalization station 20 has a personalization station base 112. Personalization station base 112 is preferably operably connected to base 14 by threaded fasteners inserted through openings 114. Personalization station 20 also includes card receiving means 116 for grasping one card 34 to be programmed.

Figure 6:
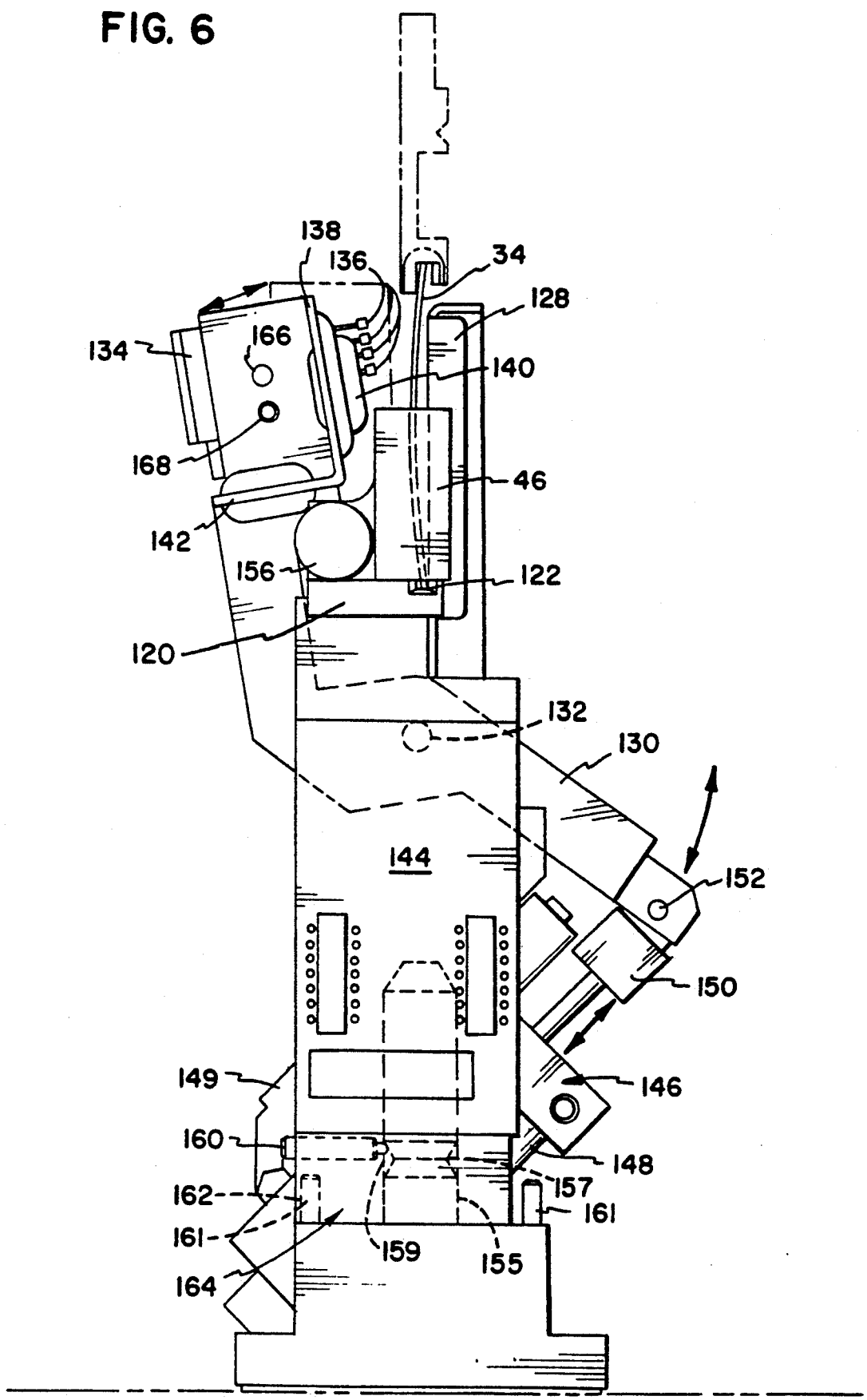
FIG. 6 shows an end view of the personalization station.
Figure 7:
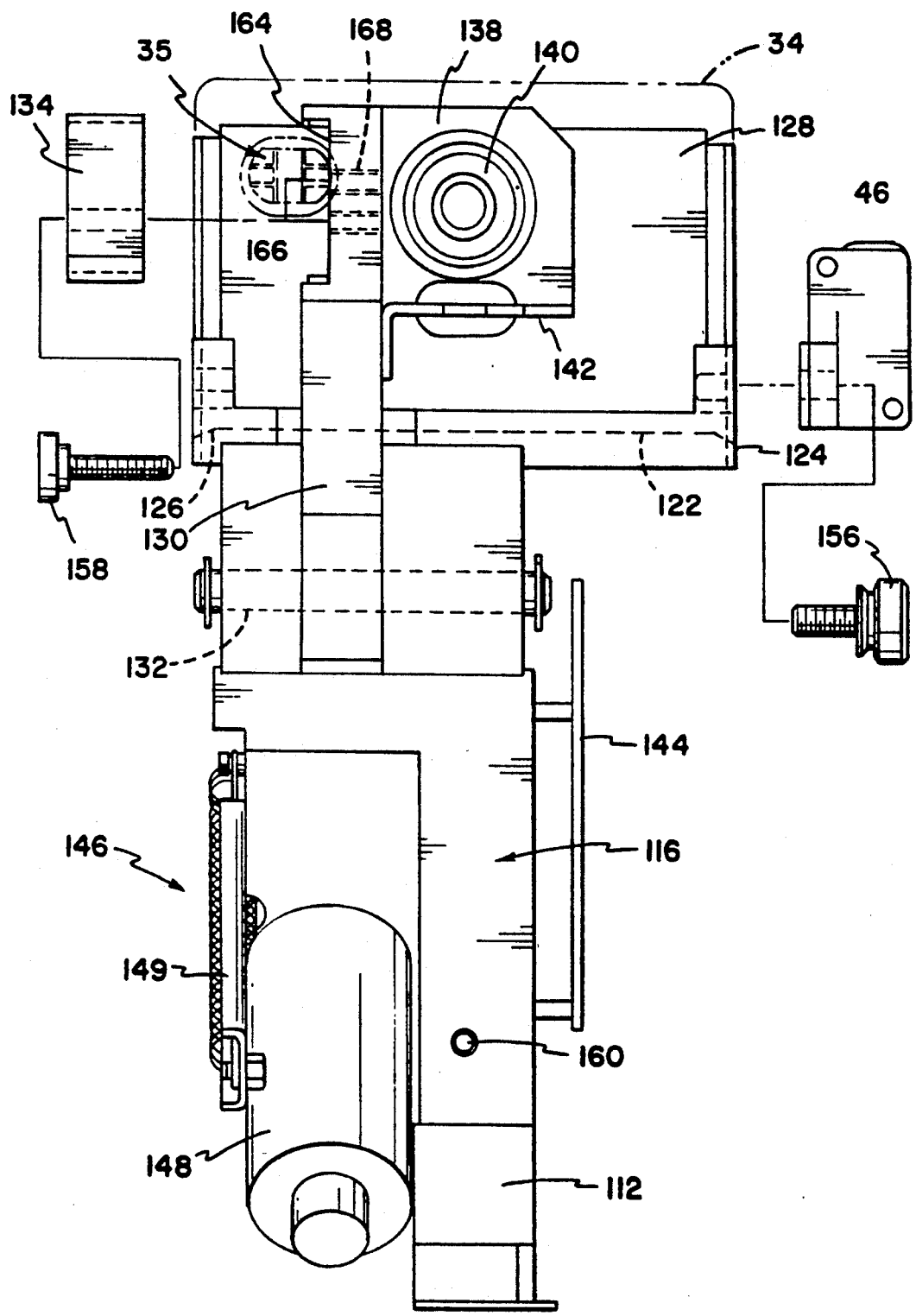
FIG. 7 shows a side view of the personalization station.

Card receiving means 116 includes an elongated riser section 118. Riser section 118 has a first end operably connectable to base 112 and a second end to which is operably connected a card receiving tray 120. As shown in FIG. 6, card receiving tray 120 has a longitudinal card receiving groove 122. Card receiving groove 122, as shown in FIG. 7, has two oppositely disposed beveled ends 124 and 126. Extending perpendicularly away from tray 120 and disposed parallel and proximate to card receiving groove 122 is a card backstop plate 128.

Rotatably mounted to riser section 118 of card receiving means 116 is a contact lever 130. Contact lever 130 is rotatably operatively connected to card receiving means 116 about a pin 132. Contact lever 130 has a first end proximate card receiving tray 120 and a second end disposed proximate base 112. Disposed proximate and operably connected to the first end of lever 130 is contact pin housing 134. Contact pin housing 134 has a plurality of contact pins 136 disposed toward card backstop plate 128. Contact pins 136 are arranged in a pattern well known to those skilled in the art.

Also disposed proximate and operably connected to the first end of contact lever 130 is a grasping plate 138. Grasping plate 138 preferably has at least one bumper 140. Extending approximately perpendicularly to grasping plate 138 is a cable support plate 142 for supporting an electrical connection (not shown) between a reader board 44 and contact pin housing 134.

As shown in FIG. 6, disposed proximate the second end of contact lever 130 is an actuator means 146 for moving contact lever 130 between a first and second position. Actuator means 146 is operably connected to card receiving means 116. Actuator means 146 includes a solenoid 148 having an actuator rod 150. Actuator rod 150 is rotatably connected to the second end of contact lever 130 about pin 152. When contact lever 130 is in the first position, contact pins 136 are proximate card backstop plate 128 for programming card 34 and grasping plate 138 is approximately parallel card backstop plate 128, as shown in FIG. 5. When contact lever 130 is in the second position, contact pins 136 are spaced distantly apart from card backstop plate 128 and grasping plate 138 is at an oblique angle to card backstop plate 128, as shown in FIG. 6. A biasing means 149 is operably connected to card receiving means 116 and contact lever 130 for biasing contact lever 130 toward the first position. Biasing means 149 is preferably a spring.

Personalization station 20 also includes a reversible mounting means 154 for mounting card receiving means 116 in first position and a second position. In the first position, for contacting the front of the card, card receiving groove 122 of card receiving means 116 is radially disposed about the rotational axis of axial member 16 of card transport 12 and contact pin housing 134 is disposed toward axial member 16. In the second position, for contacting the back of the card, card receiving means 116 is rotated pb 180° so that card receiving groove 122 of card receiving means 116 is still radially disposed about the rotational axis of axial member 16, but contact pin housing 134 is disposed away from axial member 16 of card transport 12.

In the preferred embodiment, reversible mounting means 154 include an elongated generally cylindrical pin 155 preferably having an indented portion or circumferential groove 157. Mounting means 154 also includes an opening 159 in receiving means 116. Opening 159 has a generally cylindrical shape, slightly larger than cylindrical pin 155. Extending into opening 159 is a biased pin 160 positioned to engage with groove 157, like a ball and detent when pin 155 is inserted into opening 159. Reversible mounting means 154 also preferably includes two shorter pins 161 extending from base 112 approximately parallel to pin 155 and disposed on opposite sides of pin 155. Mounting means 154 includes one additional smaller opening 162 in receiving means 116 approximately parallel opening 159. Smaller opening 162 is slightly larger, but approximately the same size as short pins 161.

As shown in FIG. 7, station card position sensor 46 and contact pin housing 134 are operably connected to card receiving means 116 with thumb screws 156 and 158, respectively. Sensor 46 is capable of being fastened to card receiving means 116 proximate beveled end 124 of card receiving groove 122 and distant contact pin housing 134 when card receiving means 116 is mounted in the first position. Sensor 46 is capable of being attached to card receiving means 116 proximate beveled end 126 of card receiving groove 122 and contact pin housing 134 when card receiving means 116 is mounted in the second position.

Contact pin housing 134 also has a first and second position. In the first position, contact pin housing 134 is inserted in a groove 164 of lever 130 and pins 136 are disposed proximate the top of card 34, as shown in FIG. 7. When contact pin housing 134 is in the first position, thumb screw 158 is threaded into a first opening 166 in lever 130. When housing 134 is in the second position, rotated 180° from the first position, pins 36 are disposed proximate the center of card 34. In the second position, thumb screw 158 is fastened into a second opening 168 in lever 130. The first position corresponds to the French position for an integrated circuit 35 on card 34. The second position corresponds to the ISO standard position of the integrated circuit 35 on card 34. The French and ISO standards are well known to those skilled in the art.

In use, IC card programming device 10 can be used to program IC cards having integrated circuit 35 disposed either on a front or a back surface of the card 34, or disposed in the French or ISO standard position with the reversible mounting means 154.

In general terms, ignoring for the moment the controller, IC card programming device 10 operates by picking up one IC card 34 deposited in card input platform 22 with card picker carriage 26. Carriage 26 and card 34 are then moved toward the proximal end of transport arm 18 and carriage linear sensor 42. Card transport 12 is rotated about axial member 16 until picker groove 83 is aligned with card receiving groove 122 of an empty pre-selected personalization station 20. Then, carriage 26 and card 34 are moved toward the distal end of transport arm 18 so that card 34 can be deposited in the pre-selected personalization station 20.

While the previously deposited card 34 is programmed in station 20, card transport 12 is available for removing and depositing cards in other personalization stations 20. Preferably, IC card programming device 10 operates on a first-in/first-out basis, that is, the first card deposited in one of the personalization stations 20 is the first card to be programmed and removed from that personalization station 20, and the second card placed within a second personalization station 20 is the second card to be programmed and removed from that personalization station, and so on.

When programming is complete, card picker carriage 26 will remove card 34. Card 34 and carriage 26 will then move toward the proximal end of transport arm 18, where card 34 will be deposited on card output platform 24 and subsequently removed by output rollers 37.

Generally, all personalization stations 20 of IC card programming device 10 will receive cards 34 before any cards 34 are removed from one personalization station 20. Once all personalization stations 20 have initially received cards, the first card 34 placed will be removed from the personalization station 20 and another card 34 will be placed therein.

When beginning to run a batch of cards through IC card programming device 10, the programming cycle of the first card 34 preferably begins with the personalization station 20 disposed furthest clockwise about axial member 16. The second and subsequent card cycles will place cards 34 in personalization stations 20 progressively further counter-clockwise around axial member 16. However, any order of cycling through personalization stations 20 is possible.

When a card cycle begins, carriage 26 is positioned at sensor 38 directly above card input platform 22. Then, card 34 is inserted in card receiving groove 58 of card input platform 22, and picker groove 83 of card picker carriage 26. Beveled end 85 of picker groove 83 and beveled entrance 60 of card receiving groove 58 help to channel card 34 into grooves 83 and 58. When card 34 is initially inserted into card receiving groove 58, kicker lever 70 is in the first position, wherein second end 78 of kicker lever 70 is disposed at an elevation greater than the bottom of groove 58 to prevent card 34 from sliding off card input platform 22.

Card input sensor 40 detects the presence of card 34 in groove 58. Then, card kicker 62 pushes card 34 firmly up into picker groove 83. To accomplish this, solenoid 64 is actuated, pushing actuator rod 66 against bearing 68, pivoting kicker lever 70 from the first position into the second position. In the second position, bearing 76 disposed at the first end of kicker lever 70 pushes against card 34 forcing card 34 snugly into picker groove 83.

Once card 34 is snugly fitted within picker groove 83, actuator means 90 of card picker carriage 26 is activated to rotate picker arms 84 from the first position to the second position to grasp card 34 between picker ends 98 of picker arms 84 and backstop 96. Carriage 26 and card 34 are then moved by stepper motor 28 and pulley system 54 to a center position between the first and second positions of carriage 26. As the trailing edge of card 34 passes card input sensor 40, so that solenoid 64 is deactivated when carriage 26 reaches the center position and spring 74 returns kicker lever 70 to the first position.

Transport stepper motor 30 then rotates card transport 12 so that picker groove 83 is in radial alignment with card receiving groove 122 of a pre-selected personalization station 20. Actuator means 146 is then activated to move contact lever 130 from the first position to the second position so that card 34 can be inserted in groove 122 between contacts 136 and card backstop plate 128.

Carriage stepper motor 28 and pulley system 54 then drive carriage 26 and card 34 toward personalization station 20. Card reader input sensor 46 detects the presence of card 34 in personalization station 20 if card 34 is properly positioned in the personalization station 20 so that contact pins 136 can contact integrated circuit 35. When card 34 is in proper alignment, solenoid 148 of actuator means 146 is deactivated and biasing means 149 returns contact lever 130 to the first position, wherein contact pin 136 contacts integrated circuit 35 of card 34. Actuator means 90 of card carriage 26 is then deactivated, releasing card 34 and programming of card 34 begins.

While card 34 is programming, carriage 26 is either returned to card input platform 22 to pick up another card 34 for programming in another personalization station 20 or to another personalization station 20 to remove a previously programmed card.

To remove card 34 from personalization station 20 after card 34 is programmed, carriage 26 is repositioned over card 34. Actuator means 90 is activated rotating picker arms 84 to the second position to grasp card 34. Actuator means 146 is then activated to rotate contact lever 130 to the second position, moving contact pins 136 away from card 34. Carriage stepper motor 28 and pulley system 54 then drive carriage 26 back to the center position.

Transport stepper motor 30 then rotates transport 12 to a rotational home position, detected by carriage rotational home sensor 44 and flag plate 48. In the rotational home position, carriage groove 83 and card receiving groove 80 of card output platform 24 are in radial alignment about the rotational axis of transport 12 with card receiving groove 58 of card input platform 22.

Carriage 26 then moved by carriage stepper motor 28 and pulley system 54 to carriage linear home sensor 42 at the second or output position. The output sensor detects the presence of card 34. Actuator means 90 releases card 34 in receiving groove 80 of card output platform 24, where output motor 32 can drive rollers 37 to remove card 34 from IC card programming device 10.

In another embodiment of the IC card programming device, the card input platform might be disposed proximate axial member 16 and the card output platform disposed proximate the preferred location of input platform 22, as described above. In such an embodiment, cards would enter the programming device proximate the axial member and exit the programming device proximate the distal end of the transport arm at an output platform proximate the location of input platform 22, as described above.

As shown in FIG. 4, the arrow proximate the arm 18 shows the motion of carriage 26 between proximal and distal end of arm 18. The arrow shown parallel actuator rod 94 of solenoid 92 shows the direction of movement of actuator rod 94. The arched arrow proximate axial member 102 and the remaining arrow proximate axial member 102 and arched surface distal end 108 show generally the direction of possible relative movement between distal end 108 and surface 106. The relative movement provided between distal end 108 and surface 106 is provided to allow for imprecise actuation of actuator rod 94 and bending or damage to picker arms 84.

Figure 8:
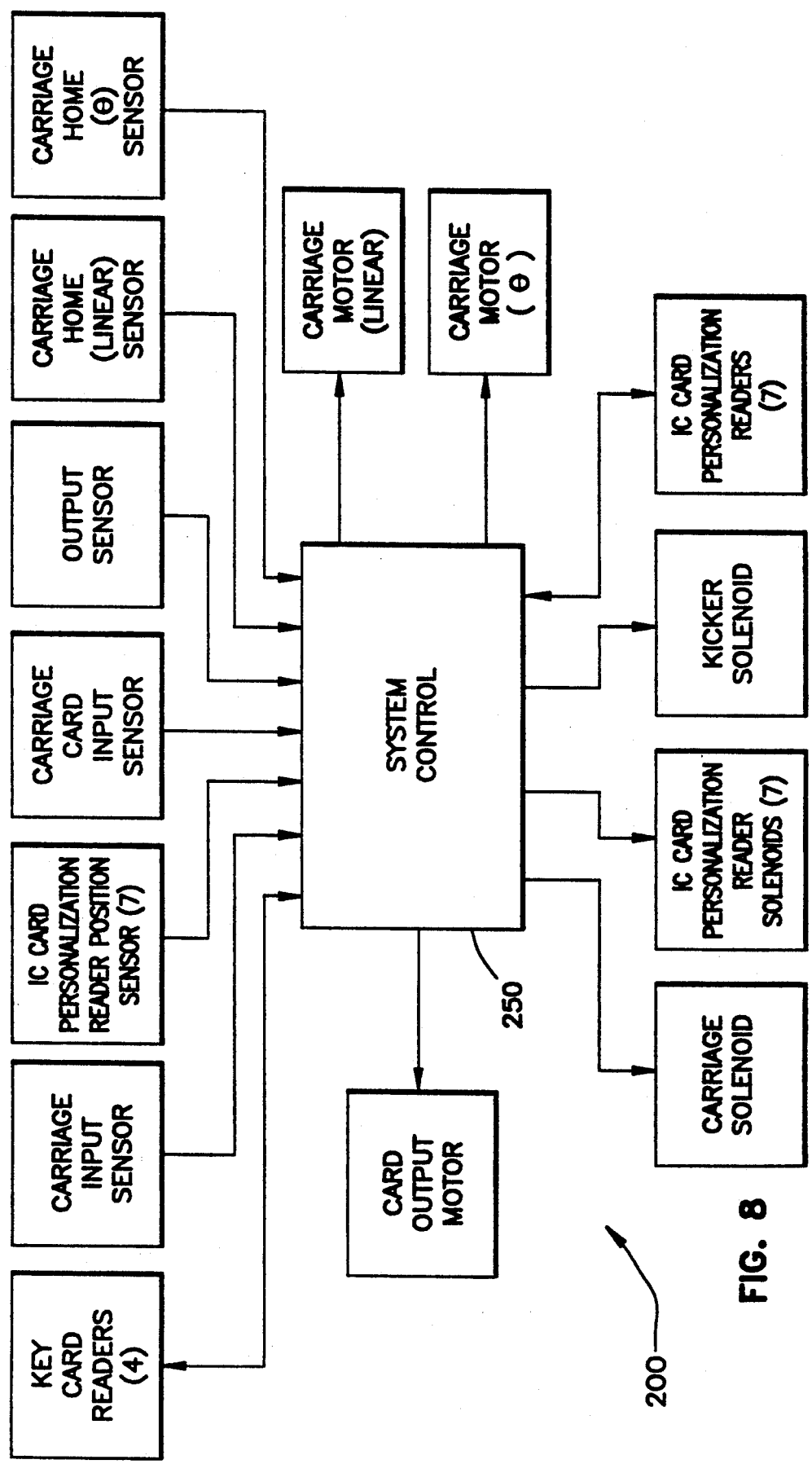
FIG. 8 is a block diagram illustrating a system control of the IC card programing device and its various inputs and outputs.
Figure 9:
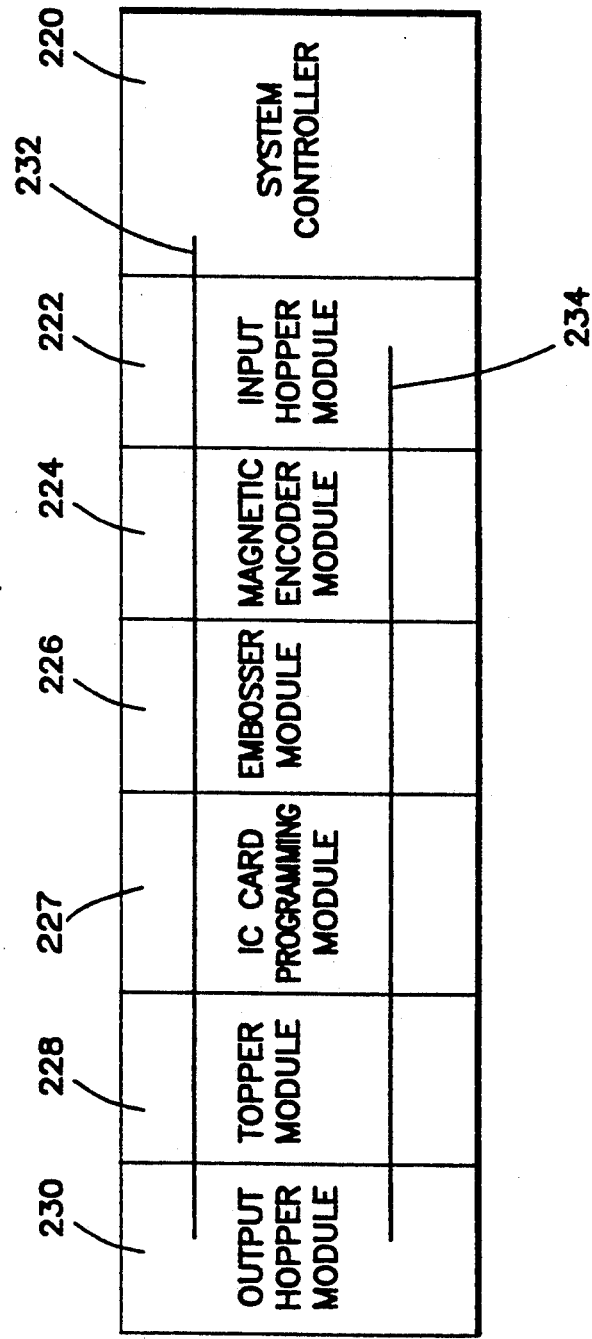
FIG. 9 shows a card processing system.

Illustrated in FIG. 8 is a block diagram illustrating a system control 200 of the IC card programming device 10 and its various inputs including senors and key card readers and outputs to the various motors, IC card personalization readers at the IC card personalization station, and solenoids of the IC card programming device. It will be appreciated that the IC card programming device might typically be part of an overall card processing system 210 having various card processing modules. An example of one such station is diagrammatically illustrated in FIG. 9. In FIG. 9 there is illustrated a card processing system 210 having a system controller 220, an input hopper module 222, a magnetic encoder module 224, an embosser module 226, a topper module 228, and an output hopper module 230 in addition to the IC card programming module. The IC card programming device 10 is illustrated as an IC card programming module 227. It will be appreciated any number and types of card processing might be present in the system.

The system controller 220 is responsible for controlling the overall operation of the card processing system and is interconnected to the various modules by a common data bus 232. Cards to be processed are transferred along a card transfer path 234 from the input hopper module 222 to the various modules for appropriate processing at each module and are delivered to the output hopper module 230 upon completion of the card processing or upon detection of a defective card. Typically, the output hopper module 230 will maintain two separate hoppers; one for successfully processed cards and one for cards which are rejected as being defective, etc. Indeed, one card processing system into which the programming module might be incorporated is the DataCard Corporation DCC 9000 card processing system.

It will be appreciated that control of the programming module might be implemented in any number of different ways. The system controller 220 will typically be responsible for overall control of the card processing system. In addition, the system controller 220 will be responsible for data management, error handling, card personalization control, etc.

Figure 10A:
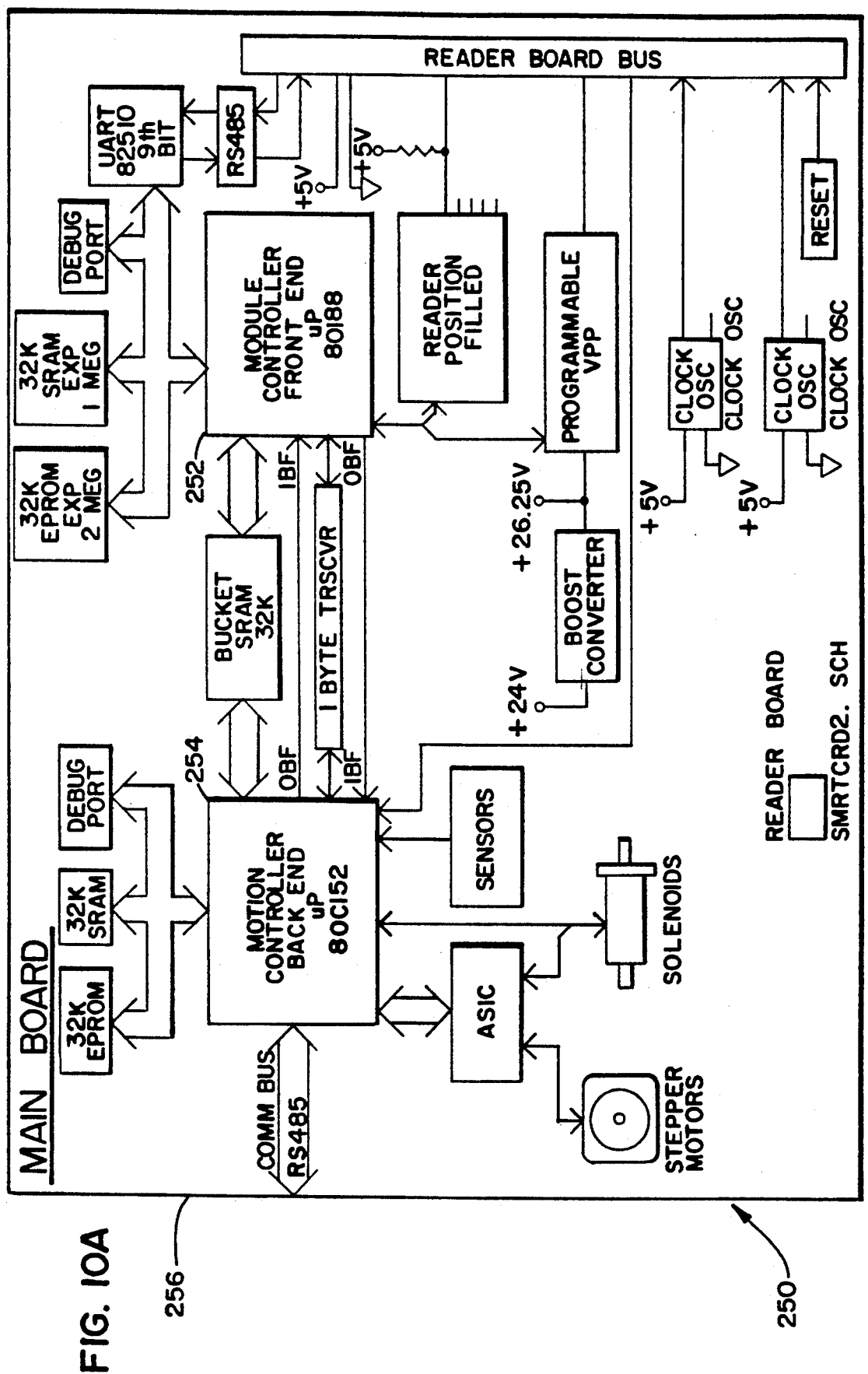
FIG. 10A shows the IC card programming module system control.
Figure 10B:
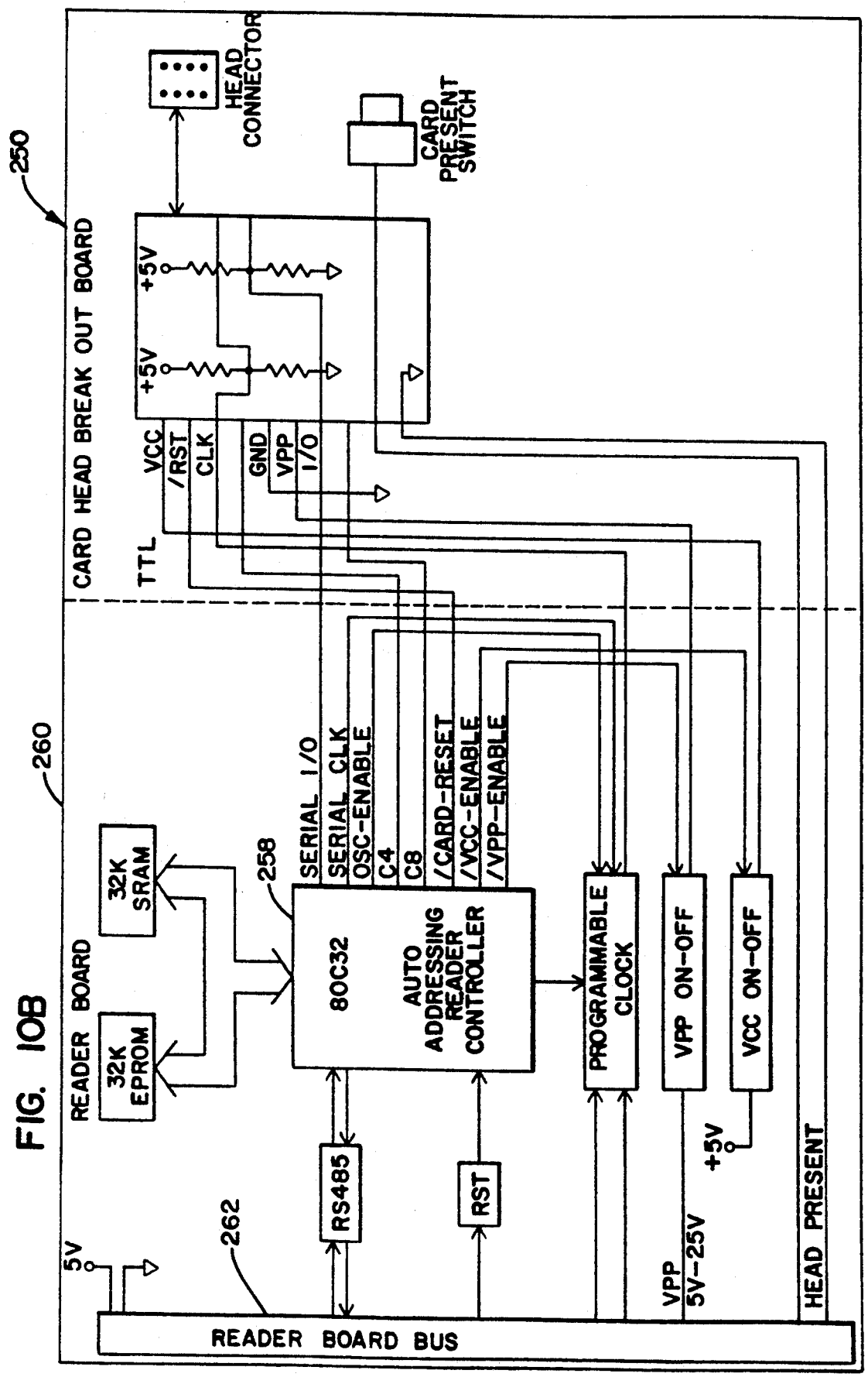
FIG. 10B shows the reader board and card head breakout board.

In the embodiment shown in FIGS. 10A–B, the IC card programming module system control 250 includes a front end microprocessor 80188, referred to as the module controller 252, and a back end microprocessor 80C152, referred to as the motion controller 254, which are mounted on a main board 256. The module controller 252 will be responsible for processing communications with the system controller 220 along the communications bus 232, managing card placement in the IC card programming module, communications with the individual IC card reader stations including the IC card readers and the key card readers, and will further be responsible for controlling the card initialization or programming cycle.

The motion controller 254 will be responsible for receiving card information from the system controller 220 and passing it through to the module controller 252, picking and placing cards on command from the module controller, and monitoring the physical state of the IC card programming module.

The module system control 250 further includes one reader controller 258 which might include an 80C32 microprcessor associated with each card reader in the IC card programming module. The reader controller 258 is mounted on a reader board 260. The reader controller 258 is responsible for reading and writing to an integrated circuit (IC) card mounted in its associated card reader. It communicates directly with the module controller 252 via a reader board bus 262. It is necessary to download an application from the system controller to each reader module including the reader modules at the key card readers and the IC card personalization readers, to the reader module in order for the reader module to be able to personalize cards.

As previously indicated there are IC card personalization readers whose responsibility is to personalize or program integrated circuit (IC) cards. These readers are the only ones that the motion controller 254 can manipulate cards into and out of. Cards are manually placed in the key card readers and remain there throughout a particular card processing application. All IC card readers must run the same application during a batch run. IC card readers may communicate with the key card readers and vice versa, but the IC card personalization readers may not communicate with each other.

In the embodiment shown, up to four key card readers may be present which have access to a fixed integrated circuit (IC) card. These key card readers have a reader controller associated with them and are interconnected to the module controller 252 by the reader board bus 262. These IC cards are not manipulated by the motion controller. Rather, these cards are fixed in place during a given card processing batch run. The key card readers can be used by an application for nearly any purpose, but commonly they are used for:

Batch verification to make sure the correct card stock is used;

Issuer validation and data, to get issuer specific data; and

Security generate or validate secure key passwords.

A typical production job wherein a batch of cards are processed comprises an application code together with a set of non-personalized cards and the data used to personalize the cards. The system controller 220 will typically include an application program which includes a dynamic link library (DLL) which is used to perform application specific configuration, application specific data preparation, etc. Personalization data will be sent from the system controller to the module controller for downloading to the reader controllers. Application code will also be developed for each of the key card readers as required by the application.

In a typical card processing system, the system controller 220 is able to send several commands to the IC card programming module. The main commands are:

RESET—used by the system controller to determine the type of card processing module and to place the IC card processing module into a known state.

PROCESS—used by the system controller to begin card and data processing in a given module of the card processing system. There is one process command sent to the IC card processing module for each card. The system controller requires each module of the card processing system to operate in a strict, FIFO manner with respect to both cards and data.

STATUS—used by the system controller to request module status.

DIAG—used by the system controller to send module diagnostics commands.

MODULE—used by the system controller to send module specific commands.

CONFIG—used by the system controller to send configuration and initialization data to the modules.

To run a particular job production, the system controller will send the following sequence of commands to each module: RESET; CONFIG; followed by a succession of PROCESS commands along with card data. A PROCESS command is sent for each card to be processed, or until an error OCCURS.

The module controller at the IC card programming module responds to the system controller in the following fashion:

RESET—the system module controller reports the number of IC card personalization readers available. In addition, the system control module homes the gripper mechanism. The module's card queue is logically emptied. Any cards in the module upon receipt of a RESET command will not be personalized. If required, any application loaded into the module will be erased.

CONFIG—parameters for mechanical motion control such as IC card reader offsets are sent to the module controller. The IC card programming module is checked to see if the application to be run is already loaded. If not, the new application is downloaded to each of the IC card personalization readers as well as the key card readers. The application dynamic linking language (DLL) is then used to configure the application in any of the readers including the key card readers and the IC card personalization readers. It will be appreciated that in various embodiments only the IC card personalization readers or only the key card readers are configured.

PROCESS—a card together with its personalized data enters the module at the same time. The card is placed in the next empty IC card personalization reader in sequence and the data is sent to that IC card personalization reader to be acted on by the application. The module controller then waits for the next IC card personalization reader to complete and returns the status of that particular card's personalization as well as the status of all mechanical operations to the system controller 220.

Below is an example which shows the results of a sequence of PROCESS commands. In this particular example, the IC card programming module has only three IC card personalization readers for purposes of this example, but it will be appreciated that the particular pattern will hold for any number of IC card personalization readers. S1, S2 and S3 are the three IC card personalization readers. Time progresses down the column. This particular example shows the results after each of seven PROCESS commands have been executed by the module controller at the IC card programming module.

| S1 | S2 | S3 | Exit | Response |
|----|----|----|------|----------|
| C1 |    |    | (null) | Card 1 starts |
| C1 | C2 |    | (null) | Card 2 starts |
|    | C2 | C3 | C1 (null) | Card 3 starts, Card 1 complete |
| C4 |    | C3 | C2 C1EndStat | Card 4 starts, Card 2 complete |
| C4 | C5 |    | C3 C2EndStat | Card 5 starts, Card 3 complete |
|    | C5 | C6 | C4 C3EndStat | Card 6 starts, Card 4 complete |

-continued

| S1 | S2 | S3 | Exit | Response |
|----|----|----|------|----------|
| C7 |    | C6 | C5 C4EndStat | Card 7 starts, Card 5 complete |

It will be noted that at the end of the third cycle that a card is in the first IC card personalization reader. The module controller of the IC card programming module waits for the card to be programmed and then instructs the motion controller to move the card to the exit which might be the output hopper module or an additional module in the card processing system. This leaves the IC card personalization reader S1 ready to receive the next card. This cycle continues until the end of a particular production job. The card and data processing is preferably FIFO such that the card in logical reader 1 always completes before that in logical reader 1+1, which must complete before that in logical reader 1+2, etc.

Figure 11:
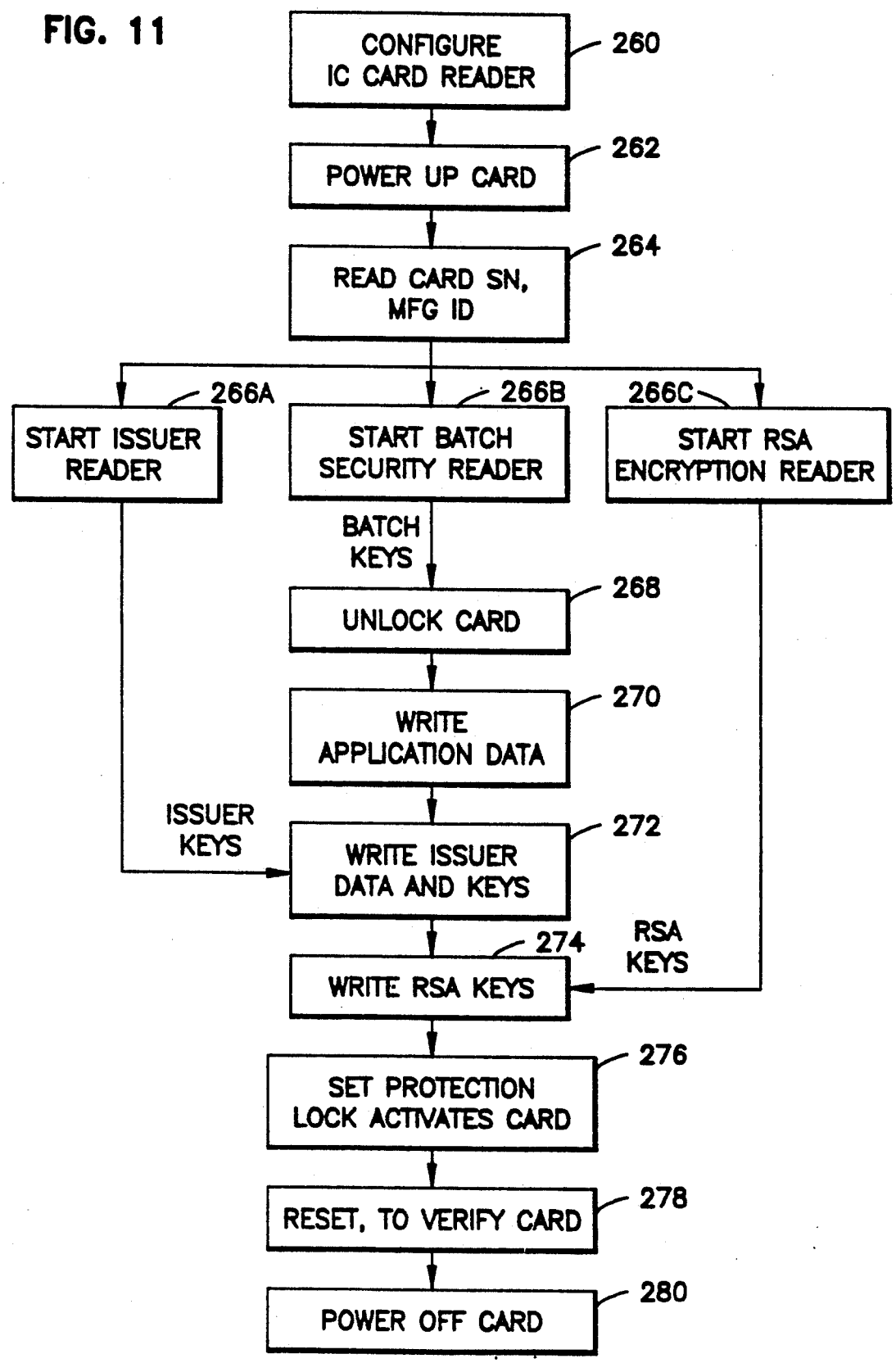
FIG. 11 shows the procedure for personalizing the card.

Illustrated in FIG. 11 is the procedure for personalizing a card at one of the IC card personalization readers. At this point in the process, the card has been delivered to the IC card personalization reader. At step 260 the IC card reader is configured. This includes indicating what kind of personalization is to be performed; e.g., memory card, IC card, etc., what kind of keys are to be utilized during the application, and what application code is to be downloaded to the reader module. At step 262 the IC card is powered up. At step 264 the IC card serial number (SN) and manufacturer identification (ID) are read. At steps 266A, B and C, three parallel tasks have started to acquire key information from the key card readers. At step 268 the IC card is unlocked and at step 270 application data is written to the IC card. At step 272 issuer data and keys are written to the IC card. At 274 RSA inscription keys are written to the IC card. At 276 a protection lock is set and the IC card is activated. At 278 the card is verified and at 280 the card is powered off.

Figure 12:
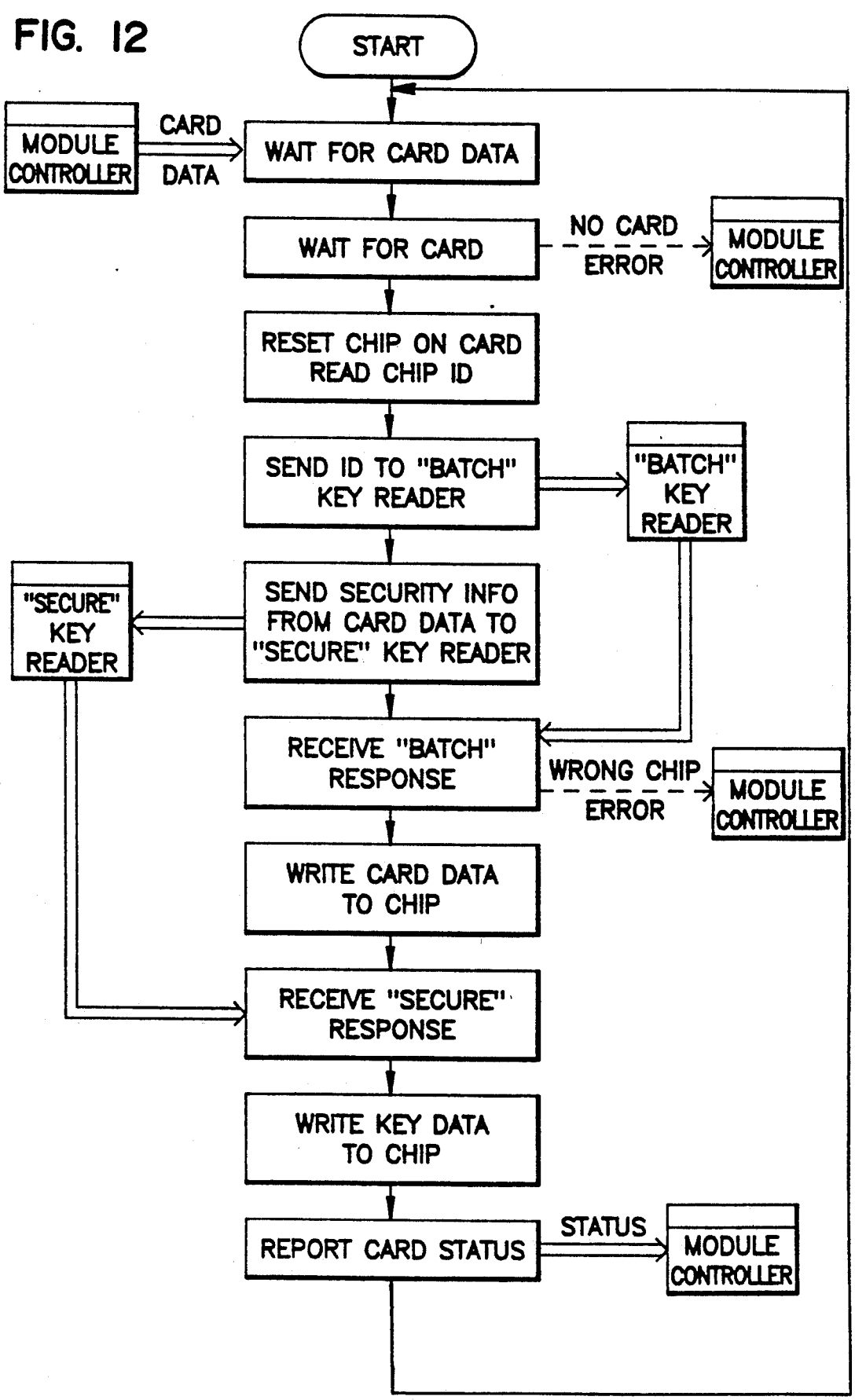
FIG. 12 shows a logic flow diagram illustrating the operations performed by the reader module.

Illustrated in FIG. 12 is a logic flow diagram illustrating the operations performed by the reader module at the IC card personalization reader. In this diagram, communications with an outside module or task is represented by a double line while an error path is represented by a dashed line.

Figure 13:
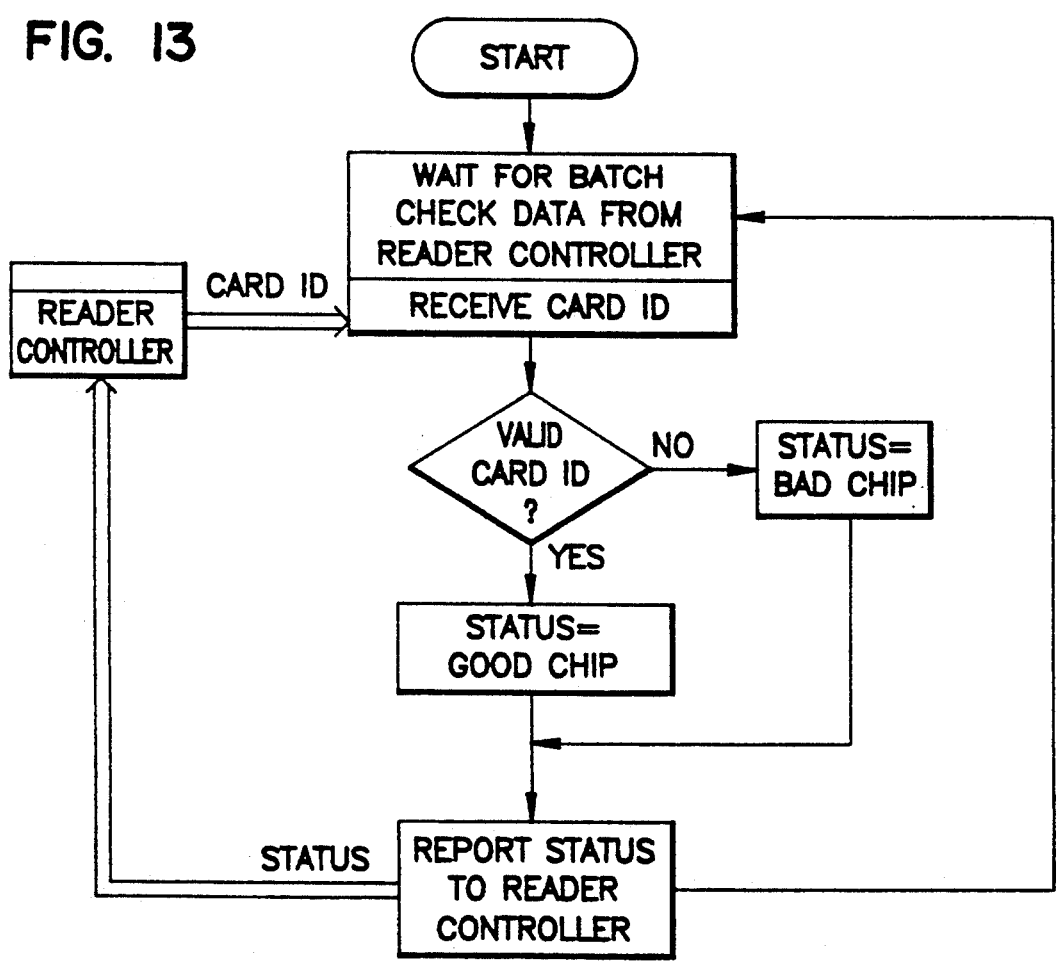
FIG. 13 illustrates a sample key card reader application.

FIG. 13 illustrates a sample key card reader application wherein the card identification (ID) is verified based on the card ID information received from the IC card programming module reader controller at the IC card personalization reader wherein the card being programmed is located.

Figure 14:
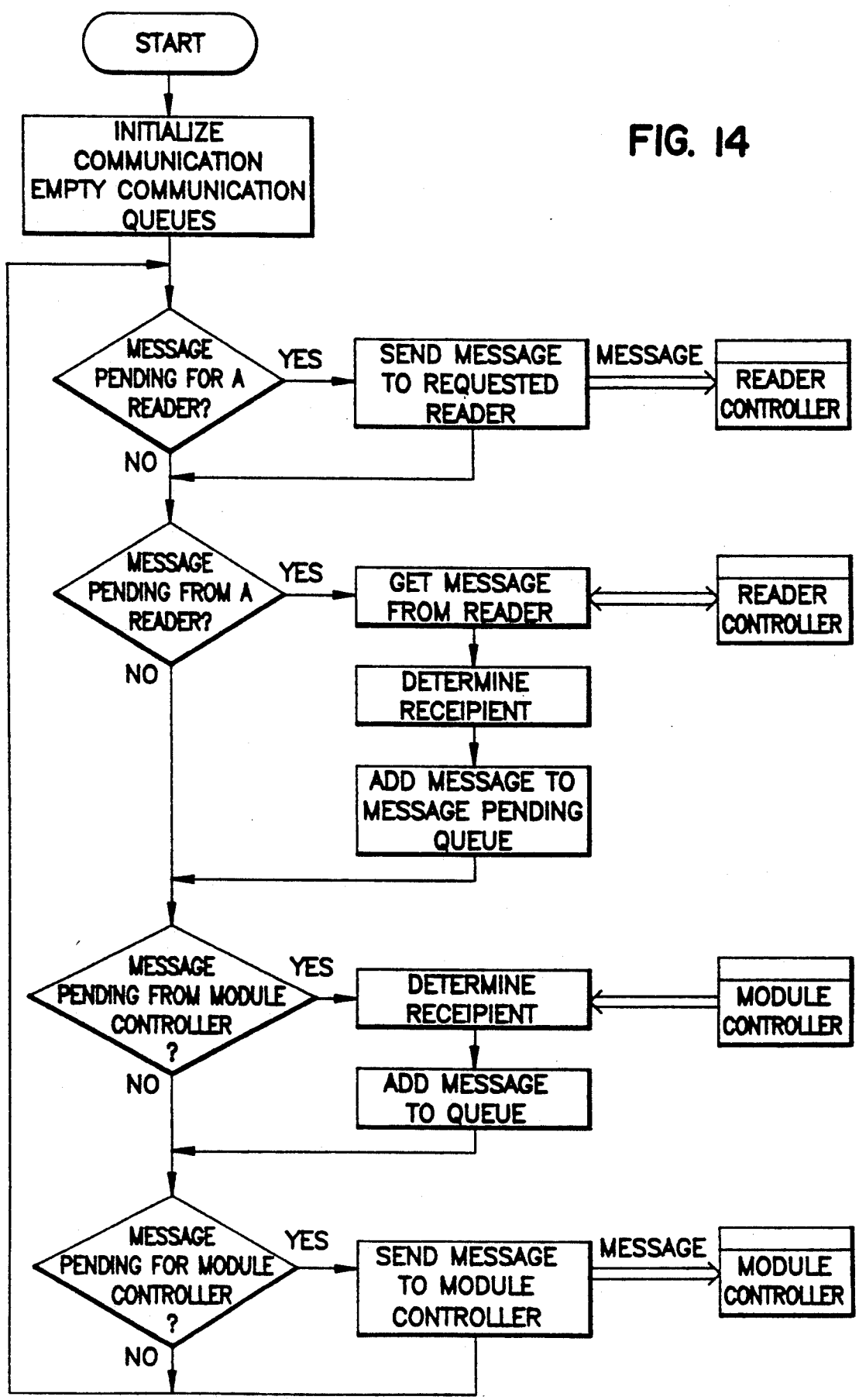
FIG. 14 shows a logic flow diagram illustrating communications between the reader controller and the IC card programming module controller.

FIG. 14 is a logic flow diagram illustrating communications between the reader controller at a particular reader and the IC card programming module's module controller.

Figure 15:
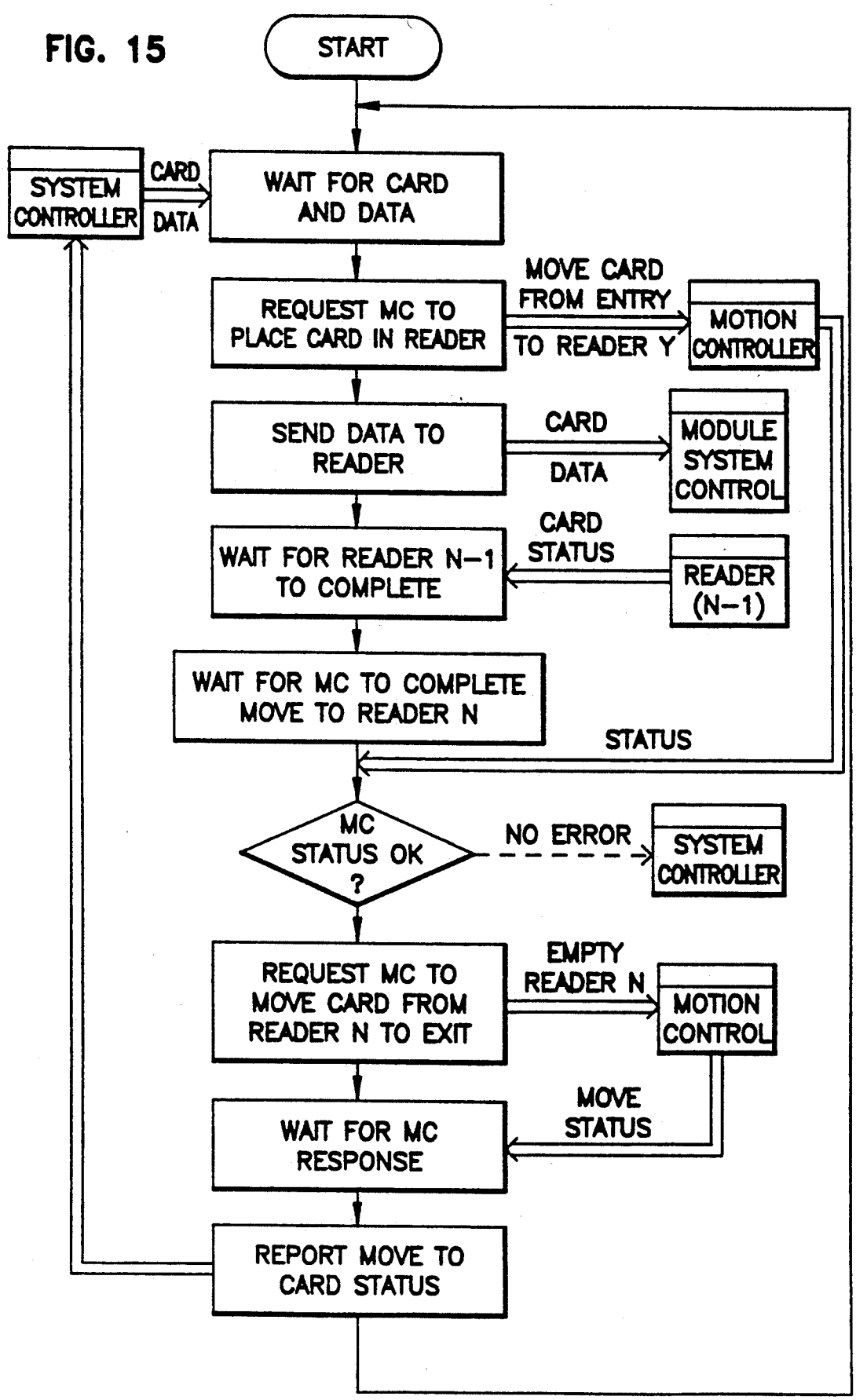
FIG. 15 shows a flow diagram illustrating arrival of an IC card and its personalization data at the IC card module.

FIG. 15 is a flow diagram illustrating arrival of an IC card and its personalization data at an IC card programming module and the movement of that card by the motion controller (MC) to the appropriate IC card reader and then removal therefrom to the exit.

Figure 16:
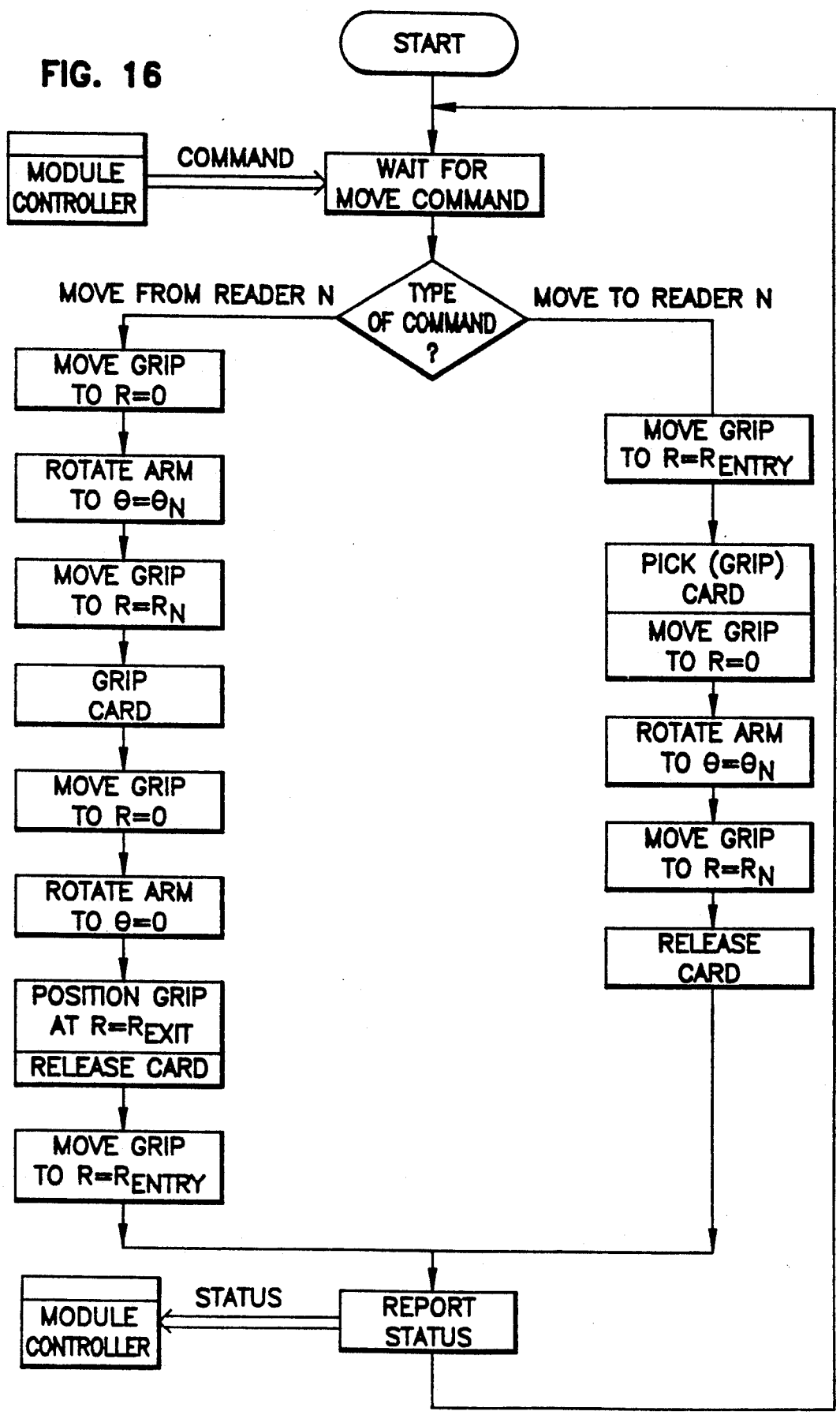
FIG. 16 shows a flow diagram illustrating movement of a IC card by the grip mechanism.

FIG. 16 is a flow diagram illustrating movement of a card by the grip mechanism (picker carriage) from a reader N and/or to a reader N.

While the present invention has been described in connection with the preferred embodiment thereof, it will be understood many modifications will be readily apparent to those skilled in the art, and this application is intended to cover any adaptations or variations thereof. It is manifestly intended this invention be limited only by the claims and equivalents thereof.

What is claimed is:

1. An integrated circuit card programming device for programming an integrated circuit card, the integrated circuit card programming device comprising:
   a base;
   a card input platform;
   a transport operably connected to the base and rotatably mounted about a rotational axis, the transport including a transport arm radially disposed from the rotational axis, the transport arm having a distal end and a proximal end, the proximal end being proximate the axis, and a card picker carriage being mounted on the arm for movement between a first position proximate the distal and a second position proximate the proximal end; and
   one or more personalization stations radially disposed about the rotational axis, so that the picker carriage in the first position can grasp a card from the input platform, then the picker carriage can be moved toward the second position and the transport rotated about the rotational axis to a position in radial alignment with one of the personalization stations and the picker carriage can be moved toward the first position to deposit the card in the personalization station to program the card.

2. The integrated circuit card programming device, in accordance with claim 1, further comprising a card output platform proximate the rotational axis and the second position of the picker carriage.

3. An integrated circuit card programming device for programming an integrated circuit card, the integrated circuit card programming device comprising:
   a base;
   a card input platform;
   a transport operably connected to the base and operably mounted about a rotational axis, the transport including a transport arm radially disposed about the rotational axis, the transport arm having a distal end and a proximal end, the proximal end being proximate the axis, and a card picker carriage being mounted on the arm for movement between a first position proximate the distal and a second position proximate the proximal end; and
   one or more personalization stations radially disposed about the rotational axis, so that the picker carriage in the second position can grasp a card from the input platform, then the transport can be rotated about the rotational axis to a position in radial alignment with one of the personalization stations and the picker carriage can be moved toward the first position to deposit the card in the personalization station to program the card.

4. The integrated circuit card programming device, in accordance with claim 3, further comprising a card output platform proximate the distal end.

* * * * *